Sept. 29, 1931. J. G. ZOLLEIS 1,825,569
CHECK VALVE
Filed Oct. 27, 1928
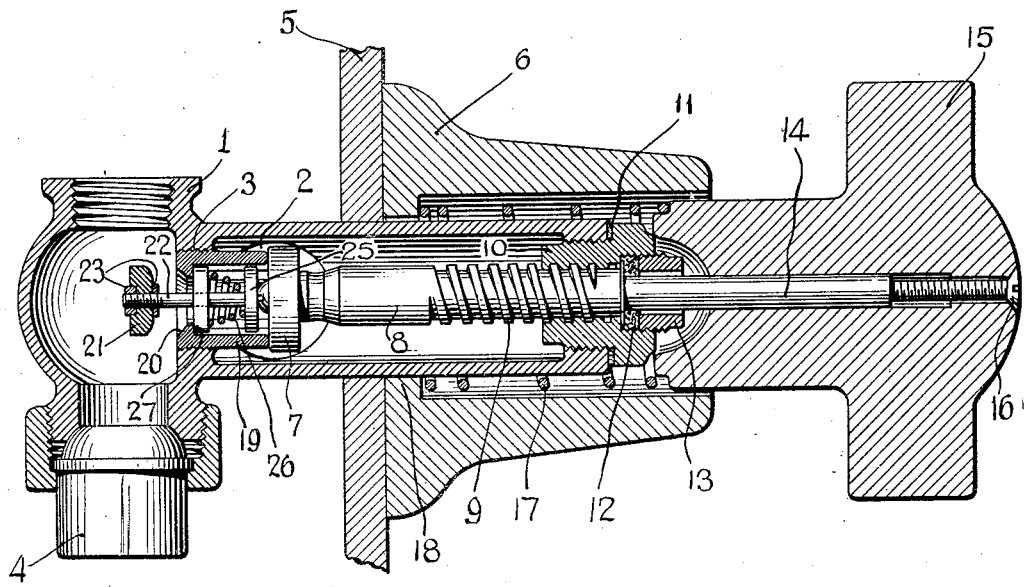
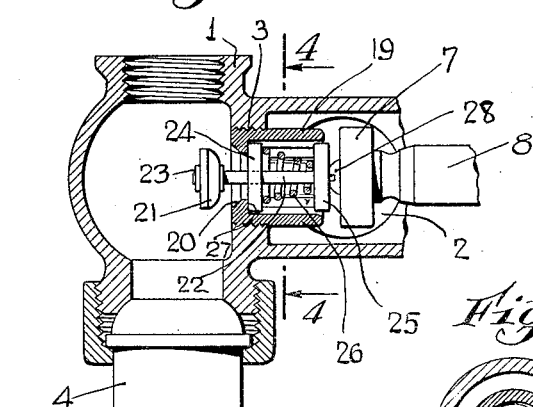
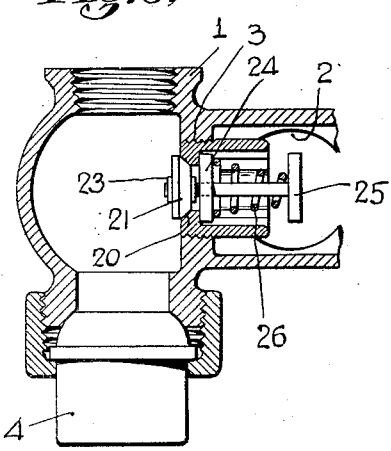
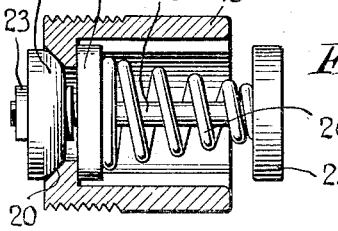
INVENTOR.
John G. Zolleis
BY Meyers & Jones
ATTORNEYS.

Patented Sept. 29, 1931

1,825,569

UNITED STATES PATENT OFFICE

JOHN G. ZOLLEIS, OF GERMANTOWN, PENNSYLVANIA

CHECK VALVE

Application filed October 27, 1928. Serial No. 315,534.

This invention is an improvement in check valves, and more particularly in an internal check normally held inoperative by the usual valve, and capable of being brought into operative position by said valve when desired.

In the usual construction of valve, when repairs must be made, or when for any reason the valve must be removed, the water must be shut off from the pipes with which the valve is connected.

Internal check valves are sometimes provided automatically moved into operative position when the valve proper is withdrawn beyond a selected distance, but so far as I am aware, all constructions of this character require a particular construction of casing, to enable the use of the valve.

One of the primary objects of the invention is the provision of a construction of this character, wherein the usual casing may be used without change.

Another object is the provision in such a construction of a selfcontained unit, including the check valve, a seat therefor, and a connection between the seat and the valve, such that while the valve may operate freely into opened or closed position, it may be removed with the seat as a unit from the casing.

Another object is the provision of a type of valve normally spring biased to operative position, and independent of the usual valve, but having parts associated therewith to be engaged by the usual valve, to hold the check open when the valve is closed or in normally open position.

With these and other objects in view the invention consists in the construction and novel combination of parts fully described hereinafter, illustrated in the accompanying drawings, and pointed out in the claims appended hereto, it being understood that various changes in the form, proportion, size and minor details of construction within the scope of the claims, may be resorted to without departing from the spirit of the invention.

In the drawings forming a part hereof:—

Fig. 1 is a vertical section through a valve casing provided with the improved check showing the parts in one position.

Figs. 2 and 3 are similar views showing a part of the casing, with the check in different positions.

Fig. 4 is a section on the line 4—4 of Fig. 2.

Fig. 5 is a sectional view of the unit removed.

In the present embodiment of the invention, the improved valve is T-shaped, comprising a cross portion 1, and a stem 2, the stem communicating with the cross portion by means of an internally threaded opening 3. The cross portion 1 of the valve casing is designed for connection with the water pipes indicated at 4, which with the major portion of the valve are arranged between the walls of a bath-room, or the like, indicated at 5, the cross portion and approximately half of the stem portion being inside the wall.

The stem extends through an opening in the wall, and is is encircled by an escutcheon 6 outside the wall, which when together with the handle of the valve to be described, are preferably of ceramic material, as shown. The escutcheon encircles the portion 2 of the casing which extends through the opening in the wall 5, and the valve 7 is connected with a stem 8, having a coarse thread 9, which engages an internally threaded packing nut 10 threaded into the outer end of the stem portion 2.

This nut forms a closure for the outer end of the stem portion 2 of the valve casing, and a gasket 11 is arranged between the nut and the end of the stem portion. The packing nut has an internally threaded recess 12 at its outer end, within which is arranged a packing as shown, the packing being held in place by a nut 13. The outer end of the stem 8 is reduced as shown at 14, and fits into an axial opening in a handle 15. A screw 16 connects the handle with the end of the stem, and it will be apparent from the description that when the handle is turned anticlockwise, the valve 7 will be moved outwardly, while when the handle is turned clock-wise the stem will be moved inwardly.

The escutcheon is pressed firmly against the wall 5 by means of a spring 17 arranged between an internal shoulder 18 at the inner end of the bore of the escutcheon and the end of the handle 14, the said end of the handle fitting into the bore of the escutcheon as shown. The seat for the valve 7 is a sleeve or bushing 19, which is threaded into the opening 3 of the valve casing. The outer end of the sleeve or bushing is a seat for the valve 7, the valve being adapted to seat against the said end, and at its opposite end the bore of the bushing is reduced to form a beveled seat 20.

A check valve 21 cooperates with the seat, and the said valve is arranged upon a stem 22 which has guided movement axially of the sleeve or bushing. The valve is held in place on the stem by nuts 23 having threaded engagement with the stem on opposite sides of the valve, and the stem is guided by a cross head 24 mounted in the bushing. Referring to Fig. 4, it will be seen that the bore of the bushing is roughly squared, and the cross head 24 has a central opening through which the stem is slidable. A second cross head 25 is secured to the outer end of the stem, and this cross head also has guided movement in the bushing. A coil spring 26 is arranged between the heads, and acts normally to move the valve toward its seat.

The cross head 24 bears at its ends against the internal reduction 27 which forms the seat 20, and the screw 28 which secures the valve 7 to the stem 8 bears against the end of the stem 22, and against the cross head 25. When the valve 7 is fully closed, as shown in Fig. 1, the spring 26 is compressed, and the valve 21 is fully open. When the valve 7 is open to enable water to flow from the water pipes through the casing, the valve 21 moves toward closed position, but does not close, the stem 22 being of sufficient length to enable the valve 7 to be fully opened, without closure of the valve 21.

When for any reason it is desired to remove the valve 7, the stem 8 is turned to move the valve 7 well away from the bushing 19, and far enough away to enable the check to seat against the end of the bushing, as shown in Fig. 3. The water is now shut off from the stem portion of the casing, and the valve 7, with its stem, the handle, and the nut 10, may be removed as a unit. After removal of these parts, the bushing 19 may be detached, by inserting a tool, such as a screw driver, in the outer end thereof, and turning in the proper direction. When the bushing is detached, it may be removed, together with the check valve and associated parts. Of course, when the check is removed, as above described, the water is shut off from the pipe 4.

It will be apparent from the description that the ordinary construction of T-shaped valve casing may be used. All of the elements of the construction are inside the casing, and all are removable when necessary, the valve proper 7 with associated parts as one unit, and the check 21 with associated parts as another unit.

What is claimed as new is:—

1. In combination with a valve casing comprising a portion for connection to a source of supply and an extension thereon for housing a valve with an opening between said portion and extension, a bushing mounted through said opening with a substantial portion of its length extending into and housed by said extension with its forward end constituting a seat for the valve, a valve seat at the rear end of the bushing, a check valve for said seat, a stem carrying said check valve, a head on the forward end of the stem having guided movement within the bushing, a guiding member for the stem in said bushing between said check valve and head, and a spring between said head and guiding member normally acting to close the check.

2. A check valve unit for use in combination with a valve casing having a valve therein comprising a tubular member for insertion in said casing between the valve and inlet opening and having its forward end spaced from said opening and forming a seat for said valve, a check valve for closing the back of said tubular member, a stem carrying said check valve, an enlarged end on the forward end of said steam having guided movement in the tubular member and adapted to be disposed therein by said first valve, a guiding member for the stem in the tubular member between said check valve and head, and a spring held within said bushing between said head and guiding member and tending to close the check valve and to project said head beyond the end of said tubular member when said first valve is moved from the forward end thereof.

Signed at Philadelphia, in the county of Philadelphia and State of Pennsylvania, this twenty-fifth day of October, A. D. 1928.

JOHN G. ZOLLEIS.